June 5, 1928.
R. REDIFER
AUTOMATICALLY SHIFTING LEVERAGE FULCRUM
Filed March 7, 1927
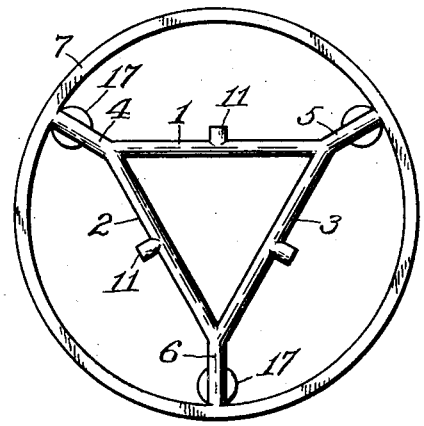
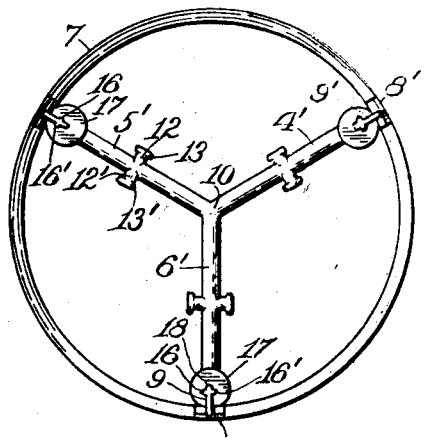
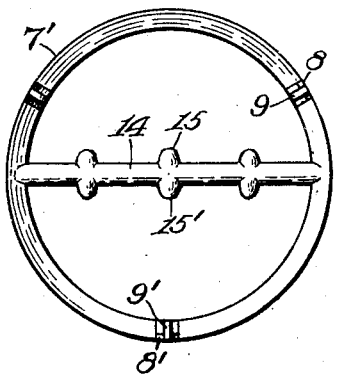
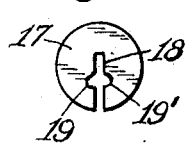
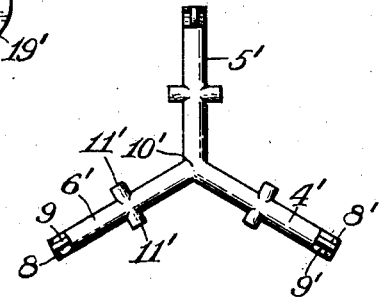
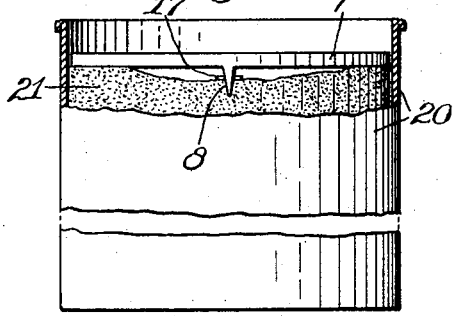
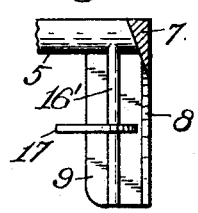
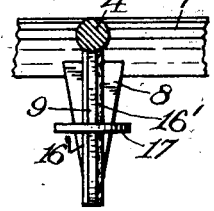
INVENTOR:
Ray Redifer,
BY E. T. Silvius,
ATTORNEY.

Patented June 5, 1928.

1,672,624

UNITED STATES PATENT OFFICE.

RAY REDIFER, OF DANVILLE, INDIANA.

AUTOMATICALLY-SHIFTING LEVERAGE FULCRUM.

Application filed March 7, 1927. Serial No. 173,399.

This invention relates to a device that is designed to be used in cans of bulk ice cream or other frozen confections when it becomes necessary to remove the same for retailing purposes, the invention having reference more particularly to a fulcrum device that is adapted to rest upon the frozen bulk and afford a bearing for the dipper or spoon handle which may be used with leverage force with great advantage, with ease of operation instead of forcing a dipper or spoon into the frozen substance directly by hand with resulting fatigue.

An object of the invention is to provide an aid to retailers or servers of frozen confections in bulk form, such as ice cream or the like, for facilitating the removal thereof from containers or cans by means of the dipper and spoon in common use.

Another object is to provide a fulcrum device which shall be of such construction as to be adapted to be readily placed in a can of ice cream to be supported upon the top of bulk ice cream and shift downward automatically as the bulk of ice cream is removed, so as to constantly afford a leverage support permitting the dipper or spoon handle to be used as a lever so that the frozen substance may be dug out without great effort.

A further object is to provide an automatically shifting leverage fulcrum of the above-mentioned character which shall be of simple but effective construction and not costly to manufacture, and which shall be adapted to be durable and economical in use.

With the above-mentioned and other objects in view, the invention consists essentially in a metallic device having a fulcrum bar or a plurality of bars adapted to have support upon the top of bulk ice cream and afford support for operating a digging device having a handle, the fulcrum device being adapted to partially sink into the frozen substance and being provided with means to prevent the lateral disarrangement of the bar or bars, and the invention consists also further in the parts and combinations and arrangements of parts as hereinafter particularly described and further defined in the appended claims.

Referring to the drawings,—Figure 1 is a top plan of one form of the invention, several forms being contemplated with slight variations to conform to containers of different diameters; Fig. 2 is an inverted plan of the fulcrum device slightly modified; Fig. 3 is a bottom plan of the fulcrum device further modified so as to be suitable for use in relatively small containers; Fig. 4 is a plan view of a device preferably comprised in the invention; Fig. 5 is a bottom plan of the fulcrum device still further modified; Fig. 6 is a fragmentary view of a container and bulk ice cream therein supporting one of the fulcrum devices; Fig. 7 is a fragmentary detail showing one of the anchoring devices comprised in the invention; and Fig. 8 is another detail view showing the anchoring device.

Similar reference characters in the different figures of the drawings indicate corresponding elements or features of construction herein referred to in detail.

The fulcrum device when constructed for the larger size container preferably comprises three metallic fulcrum bar members 1, 2 and 3 arranged in triangular form and rigidly connected together and having other bar members 4, 5 and 6 radially arranged and fixedly connected, each to two of the triangular bars. Preferably a ring 7 is rigidly connected to the ends of the radial bar members, the diameter of the ring being slightly less than that of the container in which it is to be used. Preferably the inner side of the ring is beveled so that the ring shall have a relatively sharp bottom and adapted to sink into the bulk cream and tend to slightly contract or condense the bulk with resulting frictional resistance to prevent lateral shifting of the fulcrum bars. Preferably the fulcrum bars are provided on their ends with downward extending spurs which may be cast integral therewith and with an adjacent portion of the ring, each spur preferably comprising a tapered plate 8 or a similar plate 8' connected to the lower portion of the ring, and a blade 9 or a similar blade 9' connected to the back of the plate 8 and to the fulcrum bar.

Slightly modified a plurality of fulcrum bars 4' 5' and 6' are connected at one end to a suitable center portion 10 and extend radially to the ring or rim member 7 and are connected thereto, the bars being provided with spurs if desired. Preferably each bar member 1, 2 and 3 has a projection 11 on its outer side, against which a spoon handle may have a bearing.

As shown in Fig. 5 the ring or rim member is omitted from the ends of the fulcrum bars, the latter being connected with a central hub portion 10'', each fulcrum bar being provided on each of the two opposite sides thereof with a projection 11', and the spurs are integral with the ends of the bars.

When found to be desirable because of existing conditions each fulcrum bar may be provided on one side with a lateral projection 12 provided with a head 13 and on the opposite side with a similar projection 12' having a head 13'.

For use in small containers a ring 7' of suitable width may be made and have the spurs projecting from the under side thereof, a straight fulcrum bar 14 being connected at its opposite ends to the ring and having one or more projections 15 on one side and similar projections 15' on its opposite side.

For increasing the resistance to the sinking of the spurs into the ice cream, the blade of each spur has longitudinal ribs 16 and 16' on opposite sides thereof to guide a bearing plate 17 adjustably arranged on the blade, the plate having a slot therein receiving the blade and notches 19 and 19' at the sides of the slot receiving the guide ribs. The blade fits snugly in the slot which causes frictional contact to hold the bearing plate in place when adjusted.

A suitable container or can 20 is customarily filled with bulk ice cream 21 or similar frozen confection, and after delivery to a retailer is placed in a refrigerator where the ice cream is maintained in a firm condition while being sold and delivered in small quantities.

In practical use one of the fulcrum devices is placed in a container upon the frozen confection and is quite easily removed by means of the ordinary measuring dipper or a spoon, the handle of the implement being placed against one portion of a fulcrum bar while pressing downwardly and backwardly on the handle of the implement so as to cause a digging and scraping effect in filling the implement which may then be withdrawn to lift the confection out of the container as in common practice. The lifting implement may be manipulated in various ways to remove the frozen confection evenly, the fulcrum device automatically descending as the supporting substance is removed from beneath it, small portions that may be directly under contact portions of the device being crushed down and affording lower levels of the fulcrum bars, until the contents of the container become removed.

What is claimed is:

1. An automatically-shifting leverage fulcrum having a fulcrum bar provided with a downward-extending spur to sink into a frozen confection and laterally hold the bar.

2. An automatically-shifting leverage fulcrum having a plurality of radially arranged fulcrum bars rigidly connected together each bar having on its outer end a downward-extending spur to sink into a frozen confection.

3. An automatically-shifting leverage fulcrum having a fulcrum bar provided with a lateral fulcrum projection intermediately of its ends, and a ring integral with the bar, the ring having a downwardly-extending spur to sink into a frozen confection and laterally hold the bar.

4. An automatically-shifting leverage fulcrum having a fulcrum bar to support a dipper handle, and a ring fixed to the bar to assist in supporting the bar and preventing lateral shifting thereof on a frozen confection, the bottom of the ring being sharpened for sinking into and frictionally engaging the confection.

5. An automatically-shifting leverage fulcrum including a plurality of fulcrum bars radially arranged and rigidly connected together, and a circular bearing member rigidly connected to the outer ends of the bars and provided on its under portion with a plurality of spurs having rigid connection with the bars respectively.

6. An automatically-shifting leverage fulcrum including a plurality of fulcrum bar members radially connected together, each member having a downward extending spur on its under portion, each spur being provided with a horizontal vertically adjustable bearing plate having frictional resistance contact with the spur.

7. An automatically-shifting leverage fulcrum including a plurality of fulcrum bars radially connected together and having each a downward extending spur at its end, each spur having guide ribs thereon, bearing plates having slots receiving the spurs and having also notches receiving the ribs, the plates having frictional contact with the spurs, and a circular member rigidly connected to the fulcrum bars and the spurs.

8. An automatically-shifting leverage fulcrum including a plurality of central bar members integrally connected together at their ends, each member having a projection on one side thereof intermediately of its ends, and a plurality of radially disposed bar members integrally connected each to the ends of two of the central bar members, each radially disposed bar member having a downward extending spur on the under side thereof at the outer end of the bar.

In testimony whereof, I affix my signature on the 2nd day of March, 1927.

RAY REDIFER.